(12) United States Patent
Anderson (10) Patent No.: US 10,001,837 B2
(45) Date of Patent: Jun. 19, 2018

(54) TECHNOLOGIES FOR INTERACTING WITH COMPUTING DEVICES USING HAPTIC MANIPULATION

(71) Applicant: Intel Corporation, Santa Clara, CA (US)

(72) Inventor: Glen J. Anderson, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days. days.

(21) Appl. No.: 14/580,754

(22) Filed: Dec. 23, 2014

(65) Prior Publication Data

US 2016/0179201 A1 Jun. 23, 2016

(51) Int. Cl.
*G06F 3/16* (2006.01)
*G06F 3/01* (2006.01)

(52) U.S. Cl.
CPC ............ *G06F 3/016* (2013.01); *G06F 3/013* (2013.01)

(58) Field of Classification Search
CPC ..... G06F 3/016; G06F 2203/013; G06F 3/013
See application file for complete search history.

(56) References Cited

U.S. PATENT DOCUMENTS

| | | | | |
|---|---|---|---|---|
| 2006/0109238 A1* | 5/2006 | Lau | ......................... | G06F 3/013 345/156 |
| 2006/0171695 A1 | 8/2006 | Jung | | |
| 2006/0271883 A1* | 11/2006 | Bier | ...................... | G06F 3/0481 715/853 |
| 2007/0024579 A1* | 2/2007 | Rosenberg | .............. | G06F 3/013 345/156 |
| 2012/0086645 A1* | 4/2012 | Zheng | ..................... | G06F 3/013 345/168 |
| 2013/0038792 A1 | 2/2013 | Quigley et al. | | |
| 2013/0222280 A1 | 8/2013 | Sheynblat | | |
| 2013/0307786 A1* | 11/2013 | Heubel | .................... | G08B 6/00 345/173 |

(Continued)

FOREIGN PATENT DOCUMENTS

WO  2012-076062  6/2012

OTHER PUBLICATIONS

International Search Report for PCT/US15/061603, dated Mar. 4, 2016 (5 pages).

(Continued)

*Primary Examiner* — Viet Pham
(74) *Attorney, Agent, or Firm* — Barnes & Thornburg LLP (57) ABSTRACT

Technologies for interacting with computing devices using haptic manipulation includes tracking a user's gaze on an image displayed on a display of a computing device and identifying an image object of the image based on the user's gaze. The computing device generate haptic object data for the identified image object and transmits the haptic object data to a haptic interactive device. The haptic interactive device generates a haptic object on a haptic output surface base on the haptic object data. The haptic interactive device may also monitor the user's interaction with the haptic object and generate user interactive data based on such interaction. The user interaction data may be provided to the computing device, and the computing device may modify the image based on the user interaction data.

25 Claims, 6 Drawing Sheets

(56) References Cited

U.S. PATENT DOCUMENTS

| | | | |
|---|---|---|---|
| 2014/0035736 A1* | 2/2014 | Weddle | G05D 1/005 340/407.2 |
| 2014/0256438 A1* | 9/2014 | Grant | A63F 13/10 463/36 |
| 2014/0292665 A1* | 10/2014 | Lathrop | G06F 3/013 345/173 |
| 2014/0320436 A1* | 10/2014 | Modarres | G06F 3/0412 345/173 |
| 2014/0368434 A1* | 12/2014 | Paek | G06F 3/017 345/168 |

OTHER PUBLICATIONS

Written Opinion for PCT/US15/061603, dated Mar. 4, 2016 (9 pages).

* cited by examiner

TECHNOLOGIES FOR INTERACTING WITH COMPUTING DEVICES USING HAPTIC MANIPULATION

BACKGROUND

Computing devices, in all their variety, are pervasive in the everyday life of many people. Some computing devices allow extensive user interaction, such as a smartphone or desktop computer; while others allow only limited user interaction. To facilitate such user interaction, many computing devices include some type of user interface such as a keyboard, mouse, touchscreen, or the like. Depending on the current activity of the user, interacting with the computing device via some user interfaces may be challenging.

In addition to user interfaces for receiving user input, many computing devices include one or more output devices, such as a display. A relatively emerging output technology is the use of haptic surfaces or devices as output devices for certain computing devices. A haptic device or surface provides a user with tactile feedback to create a sense of touch via use of an array of haptic actuators. For example, some haptic surfaces or devices can simulate contours, edges, or textures. In some cases, a haptic surface or device is integrated into another output device, such as an output screen, to provide the user with an amount of haptic feedback in response to interaction with the output device (e.g., pressing a virtual button on the display screen of a computing device may provide a rumble effect).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A or C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
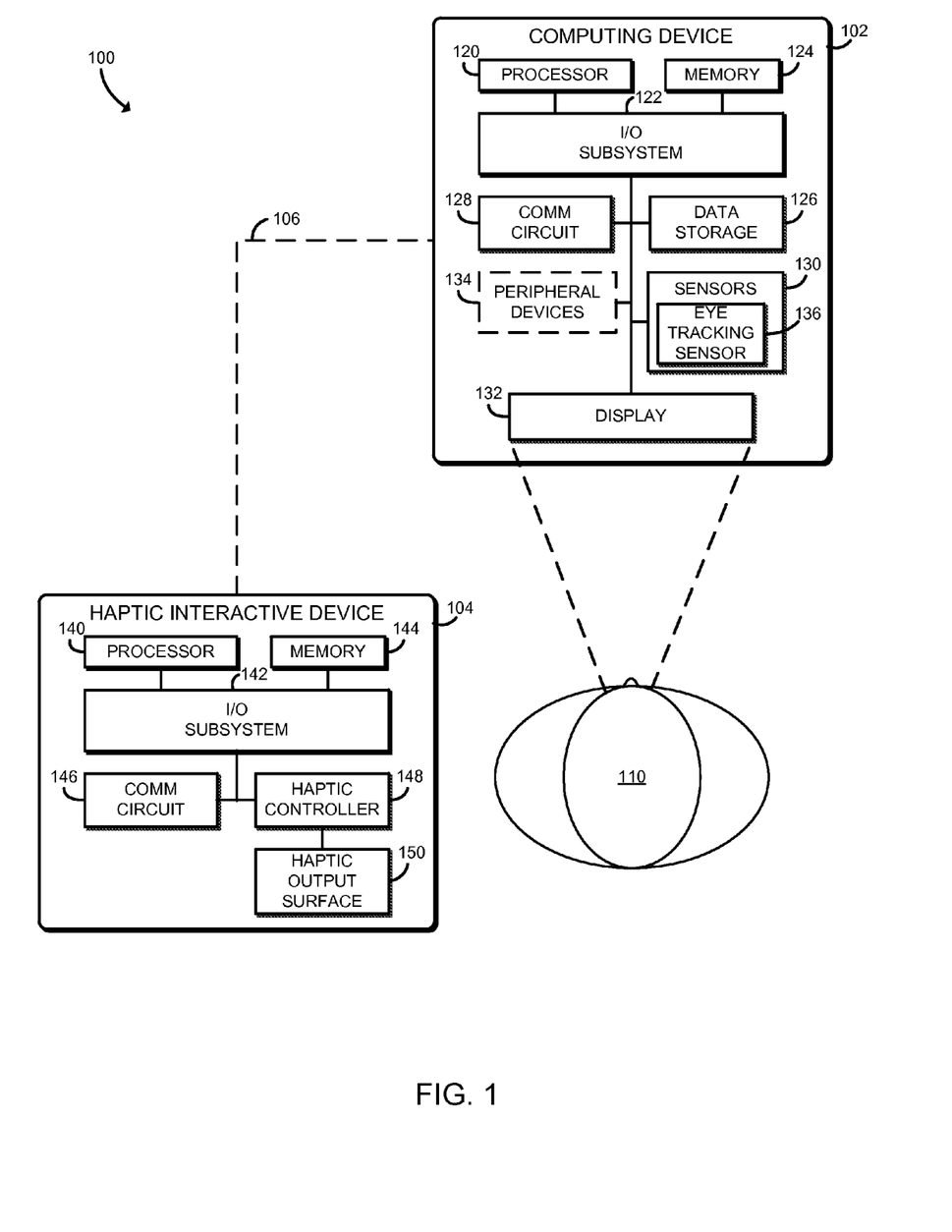
FIG. 1 is a simplified diagram of at least one embodiment of a system for haptic manipulation of a computing device.

Referring now to FIG. 1, a system 100 for managing haptic manipulation of a computing device includes a computing device 102 and a haptic interactive device 104, which communicative with each other over a communication link 106. In use, as discussed in more detail below, the computing device 102 displays an image to a user 110 on a display 132 and tracks the user's 110 gaze on the image. The computing device 102 identifies an image object of the image that has been selected by the user 110 based on the user's 110 gaze (e.g., based on a fixation of the user's 110 gaze on the image object). The image object may be embodied as a pre-defined virtual object (e.g., a virtual button or control device, a picture, or component of the image), as an area or region of the image, or other component, subcomponent, or portion of the image. The computing device 102 generates haptic object data based on the identified image object and transmits the haptic object data to the haptic interactive device 104. The haptic interactive device 104 generates a haptic object based on the haptic object data to allow the user 110 to interact with the haptic object using the user's 110 sensor of touch. The haptic interactive device 104 also monitors the user's 110 interaction with the haptic object and generates user interaction data indicative of such interaction. For example, the haptic interactive device 104 may generate user interaction data indicative of the user's 110 deletion, movement, rotation, flipping, or other interaction of the haptic object or a component of the haptic object (e.g., a portion of the haptic object may be deleted or modified on the haptic interactive device 104). The haptic interactive device 104 transmits the user interaction data to computing device 102, which modifies or updates the image object based on the user interaction data. For example, the computing device 102 may delete a component of the image object based on user interaction data indicative of the user's 110 deletion of a corresponding component of the haptic object generated on the haptic interactive device 104. In this way, the user 110 may interact with the computing device 102 using the haptic interactive device 104 and the user's 110 sense of touch, which may improve the user's 110 efficiency because the user 110 need not switch her gaze from the computing device 102 while manipulating the image object via the haptic interactive device 104.

The computing device 102 may be embodied as any type of computing device capable of tracking a user's gaze and performing the other functions disclosed herein. For example, the computing device 102 may be embodied as or otherwise include, without limitation, a head-mounted display, smart eyeglasses, a smart phone, a smart watch, a computer, a tablet computer, a laptop computer, a notebook computer, a mobile computing device, a cellular telephone, a handset, a messaging device, a distributed computing system, a multiprocessor system, a processor-based system, a consumer electronic device, and/or any other computing device capable of displaying images to a user and tracking the user's gaze. As shown in FIG. 1, the illustrative computing device 102 includes a processor 120, an I/O subsystem 122, a memory 124, a data storage 126, a communication circuit 128, and sensors 130, which include one or more eye tracking sensors 136. Of course, the computing device 102 may include other or additional components, such as those commonly found in a computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments The processor 120 may be embodied as any type of processor capable of performing the functions described herein. For example, the processor 120 may be embodied as a single or multi-core processor(s), a single or multi-socket processor, a digital signal processor, a microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 102, on a single integrated circuit chip.

The data storage 126 may be embodied as any type of device or devices configured for the short-term or long-term storage of data. For example, the data storage 126 may include any one or more memory devices and circuits, memory cards, hard disk drives, solid-state drives, or other data storage devices.

The communication circuit 128 may be embodied as any communication circuit, device, or collection thereof, capable of enabling communications between the computing device 102 and the haptic interactive device 104. To do so, the communication circuit 128 may be configured to use any one or more communication technology and associated protocols (e.g., Ethernet, Bluetooth®, Wi-Fi®, WiMAX, etc.) to effect such communication.

The sensors 130 may be embodied as any type of sensor or collection of sensors commonly found on a computing device having the capability to track a user's gaze. For example, the sensors 130 include one or more eye tracking sensors 136. The eye tracking sensor 136 may be embodied as any one or more active or passive sensors capable of determining a direction of the user's gaze. For example, in some embodiments, the eye tracking sensor 136 may use active infrared emitters and infrared detectors to track the viewer's eye movements over time. The eye tracking sensor 136 may capture the infrared light reflected off of various internal and external features of the viewer's eye and thereby calculate the direction of the viewer's gaze. In other embodiments, the eye tracking sensor 136 may be embodied as a video camera capable of recording the user's eye motion. In some embodiments, the eye tracking sensor 136 may gather eye tracking data for both of the user's eyes to improve tracking accuracy. In those embodiments, the eye tracking sensor 136 may use more than one active or passive sensor components to track both of the user's eyes. Additionally, in some embodiments, the sensors 130 may also include two-dimensional and/or three-dimensional cameras, microphone arrays, and/or other sensors to allow the user 110 to interact with haptic objects generated by haptic interactive device 104 via the computing device 102.

The display 132 may be embodied may be embodied as any type of display capable of displaying images, data, and other information to the user 110 including, but not limited to, a liquid crystal display (LCD), a light emitting diode (LED), a plasma display, a cathode ray tube (CRT), or other type of display device. Additionally, the display(s) 132 may be of any size or shape and have any suitable resolution, color, and/or have any other feature or quality commonly found in a display. Illustratively, the display 132 is local to the computing device 102, but may be remote therefrom in other embodiments. In such embodiments, the computing device 102 is communicatively coupled to the display 132 to perform the functions described herein. Additionally, in some embodiments, some or all of the sensors 130 may be collocated with the display 132 or located remotely from the display 132 (e.g., located in a device separate from the display 132).

In some embodiments, the computing device 102 may further include one or more peripheral devices 134. Such peripheral devices 134 may include any type of peripheral device commonly found in a computer device, for example, a hardware keyboard, input/output devices, peripheral communication devices, and/or other peripheral devices.

The haptic interactive device 104 may be embodied as any type of device capable of generating haptic objects (e.g., contours, elevations, geometric shapes, etc.) that are detectable by the user 110 using a sense of touch. The illustrative haptic interactive device 104 includes a processor 140, an I/O subsystem 142, a memory 144, a communication circuit 146, a haptic controller 148, and a haptic output surface 150. The processor 140, the I/O subsystem 142, the memory 144, and the communication circuit 146 may be similar to the corresponding components of the computing device 102, the description of which is applicable to those components of the haptic interactive device 104 and is not repeated herein for clarify of the description.

The haptic controller 148 of the haptic interactive device 104 may embodied as any circuit or collection of electrical components capable of controlling operation of the haptic output surface 150. For example, in some embodiments, the haptic controller 148 may include a proportional-integral-derivative (PID) controller to control the actuation of the haptic output surface 150. The haptic output surface 150 may be embodied as any type of haptic surface or structure capable of generating tactile feedback to a user's 110 sense of touch. To do so, the haptic output surface 150 may utilize any suitable technology to apply a force, vibration, motion, or physical alternation that is capable of being tactilely sensed by the user 110. For example, in some embodiments, the haptic output surface 150 includes an array of actuators, which are controlled by the haptic controller 148 to generate the desired tactile feedback to the user 110. As discussed in more detail below, the haptic controller 148 is configured to control the haptic output surface 150 based on haptic object data received from the computing device 102 to cause the haptic output surface 150 to generate a haptic object, which is capable of being felt by the user.

In some embodiments, the haptic interactive device 104 may include additional sensors, such as cameras and microphones, to receive user input. In such embodiments, the additional sensors allow the user 110 to interact with the generated haptic object in ways other than through the sense of touch, such as via voice commands or air gestures, for example.

The communication link 106 may be embodied as any type of communication link or connection capable of facilitating data transfers between the computing device 102 and the haptic interactive device 104. For example, in some embodiments, the communication link 106 may be embodied as a short-ranged communication link such as, but not limited to, a Bluetooth communication link, a Near Field Communications (NFC) link, a ZigBee® communication link, or other short-ranged communication link. However, in other embodiments, the communication link 106 may be embodied as a long-range communication link such as a network link (e.g., a data network, a cellular network, the Internet, etc.).

Figure 2:
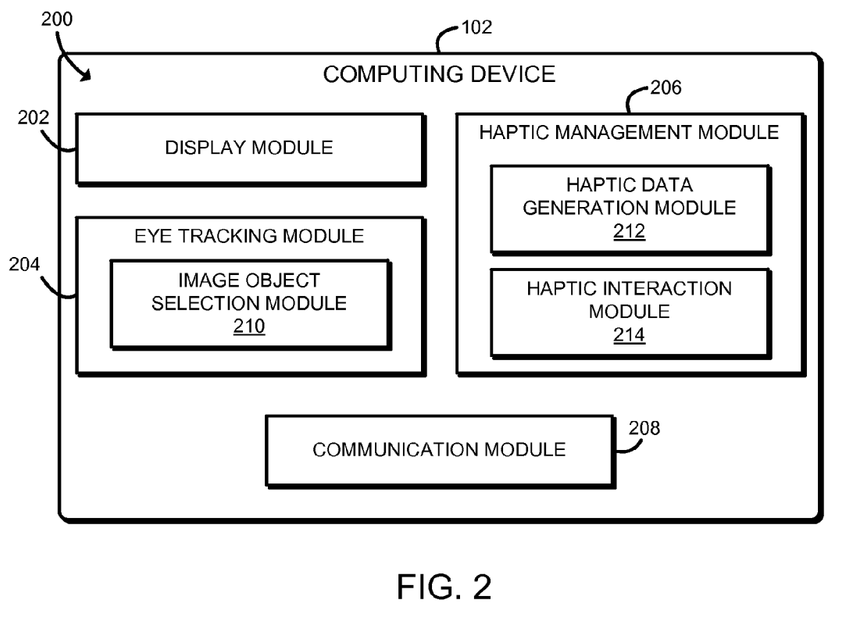
FIG. 2 is a simplified block diagram of at least one embodiment of a computing device of the system of FIG. 1.

Referring now to FIG. 2, in use, the computing device 102 may establish an environment 200. The illustrative environment 200 includes a display module 202, an eye tracking module 204, a haptic management module 206, and a communication module 208. Additionally, the eye tracking module 204 may include an image object selection module 210, and the haptic management module may include a haptic data generation module 212 and a haptic interaction module 214. Each of the modules and other components of the environment 200 may be embodied as firmware, software, hardware, or a combination thereof. For example the various modules, logic, and other components of the environment 200 may form a portion of, or otherwise be established by, the processor 120, the I/O subsystem 122, an SoC, or other hardware components of the computing device 102. As such, in some embodiments, any one or more of the modules of the environment 200 may be embodied as a circuit or collection of electrical devices (e.g., an eye tracking circuit, a haptic management circuit, etc.).

The display module 202 is configured to control the display 132 of the computing device 102 to display images thereon. Such images may be embodied as any type of images commonly displayed by computing devices including, but not limited to, game images, application images, browser images, and/or other images. It should be appreciated that such images may not be static in some embodiments and may be, for example, embodied as or be included in video content. As discussed in detail below, the images displayed on the display 132 may include one or more image objects, which may be selected by the user 110 by fixating her gaze on the desired image object. The image object of the displayed image may be embodied as discrete virtual objects, such as a virtual button, control, item, graphic, or other virtual construct with which the user 110 may interact. Alternatively, the image object may be embodied as a region, sub-region, or area of the image, which may or may not include one or more virtual objects (e.g., the center portion of the image, the upper left corner of the image, etc.).

In some embodiments, the image displayed on the display 132 may be embodied as an image of the local environment of the user 110. For example, a camera of the sensors 130 may capture an image of the local environment of the user 110, which is subsequently displayed on the display 132. In this way, the user 110 may interact with virtual representation of real-world objects locale within the user's 110 environment.

The eye tracking module 204 is configured to track the gaze of the user 110 using the eye tracking sensor 136. As discussed above, the eye tracking module 204 may utilize any suitable eye tracking technology and/or methodology to track the gaze of the user 110 based on, for example, the type of eye tracking sensor 136. For example, as discussed above, the eye tracking module 204 may track the user's 110 gaze by analyzing tracking data indicative of infrared light reflected off of the user's 110 eye, by analyzing captured images of the user's eye, and/or the like.

The image object selection module 210 of the eye tracking module 204 is configured to identify an image object of the image displayed on the display 132 based on the user's gaze. To do so, the image object selection module 210 identifies the image object based on the location of the gaze of the user 110. The image object selection module 210 may identify the image object as being selected by the user 110 based on a fixation of the user's 110 gaze on the identified image object. For example, the image object selection module 210 may infer the user's 110 selection of the image object in response to the user's fixation on the image object for a reference period of time or greater. As such, the user 110 may select a particular image object of the displayed image by looking at the image object for a certain length of time. As discussed above, the image object may be embodied as a discrete virtual object of the image or as a region or area of the image displayed on the display 132 by the display module 202.

The haptic management module 206 is configured to manage the haptic interaction of the user 110 with the computing device 102. To do so, the haptic data generation module 212 is configured to generate haptic object data for the image object identified by the image object selection module 210. The haptic object data may be embodied as any type of data usable by the haptic interactive device 104 to generate a haptic object corresponding to the selected image object. For example, if the user selects an image of a tree from an image displayed on the display 132, the haptic data generation module 212 generates haptic object data usable by the haptic interactive device 104 to generate a haptic representation of the tree on the haptic output surface 150 (e.g., by generating the contours or outline of the tree image). The communication module 208 controls the communication circuit 128 to transmit the haptic object data to the haptic interactive device 104 to facilitate generation of the corresponding haptic object.

As discussed in more detail below, the user 110 is able to manipulate, modify, or otherwise interact with the haptic object generated by the haptic interactive device 104. The haptic interactive device 104 generates user interaction data indicative of such interaction and transmits the user interaction data to the computing device 102. In response, the haptic interaction module 214 of the haptic management module 206 is configured to modify or update the image object corresponding to the haptic object based on the user interaction data. For example, referring back to the tree example, the user 110 may interact with the haptic interactive device 104 using her sense of touch to rotate the tree on the haptic output surface 150. In response, the haptic interaction module 214 modifies or updates the corresponding image object of the tree by rotating the image of the tree on the image displayed on the display 132. The haptic interaction module 214 may perform any number or types of modification, updates, or other manipulations of the image object based on the user interaction data.

Figure 3:
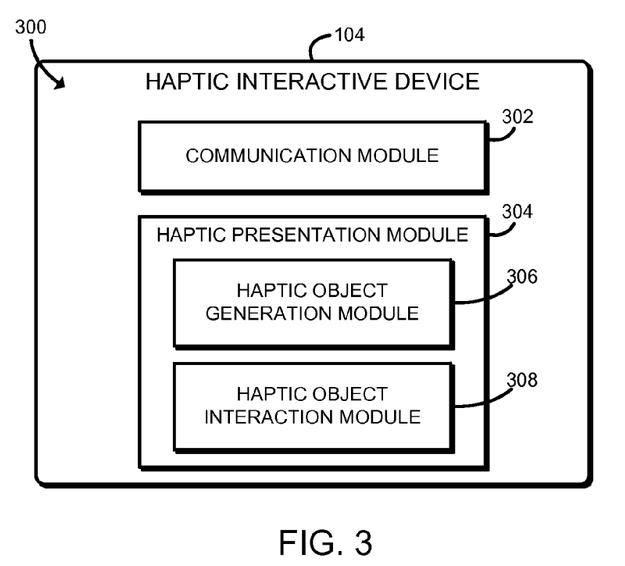
FIG. 3 is a simplified block diagram of at least on embodiment of a haptic interactive device of the system of FIG. 1.

Referring now to FIG. 3, in use, the haptic interactive device 104 may establish an environment 300. The illustrative environment 300 includes a communication module 302 and a haptic presentation module 304, which includes a haptic object generation module 306 and a haptic object interaction module 308. Each of the modules and other components of the environment 300 may be embodied as firmware, software, hardware, or a combination thereof. For example the various modules, logic, and other components of the environment 300 may form a portion of, or otherwise be established by, the processor 140, the I/O subsystem 142, the haptic controller 148, an SoC, or other hardware components of the haptic interactive device 104. As such, in some embodiments, any one or more of the modules of the environment 300 may be embodied as a circuit or collection of electrical devices (e.g., a communication circuit, a haptic object generation circuit, etc.).

The communication module 302 is configured to control the communication circuit 146 to communicate with the computing device 102. For example, as discussed above, the communication module 302 receives haptic object data from the computing device 102 in response to the user selecting an image object via the user's gaze. Additionally, the communication module 302 transmits user interaction data indicative of the users' 110 interaction with a haptic object generated by the haptic interactive device 104 to the computing device 102.

The haptic presentation module 304 is configured to control the haptic controller 148 and haptic output surface 150 to generate haptic objects based on the haptic object data received from the computing device 102, monitor the user's 110 interaction with the generated haptic object, and generate the user interaction data indicative of the user's interaction with the generated object. To do so, the haptic object generation module 306 is configured to control the haptic controller 148 to generate the haptic object on the haptic output surface 150 based on the haptic object data. As discussed above, the haptic object data may be embodied as any type of data usable by the haptic object generation module 306 and/or haptic controller 148 to generate the haptic object corresponding to the selected image object. In some embodiments, the haptic object data may be embodied as specific control instructions usable by the haptic controller 148 to control the haptic output surface 150. In other embodiments, the haptic object data may be embodied as reference data usable by the haptic object generation module 306 to generate the specific control instructions usable by the haptic controller 148.

The haptic object interaction module 308 is configured to monitor the user's interaction with the haptic object generated on the haptic output surface 150. As discussed above, the user 110 may interact with the haptic object by, for example, moving, deleting, rotating, shifting, flipping, or resizing the haptic object or a component of the haptic object. For example, touch sensitive sensors of the haptic output surface 150 may sense touch inputs from the user 110, which are interpreted by the haptic object interaction module 308 as interactions with the haptic object. Of course, the user 110 may interact with the haptic object in other ways in other embodiments. The haptic object interaction module 308 monitors such interaction and generates user interaction data indicative of the user's 110 interaction with the haptic object. The user interaction data may be embodied as any type of data that is capable of defining or identifying the user's interaction. In the illustrative embodiment, the user interaction data is embodied as data usable by the computing device 102 to modify or update the image data. As such, the user interaction data may be embodied as, or otherwise include, spatial data, pixel data, vector data, instruction data, raw image data, or any other type of data from which the computing device 102 can infer or determine the user's desired interaction with the image object displayed on the display 132. In some embodiments, the haptic interactive device 104 may include additional sensors, such as cameras and microphones, to receive user input, thus the user may interact with the haptic object for example through voice commands and air gestures.

Figure 4:
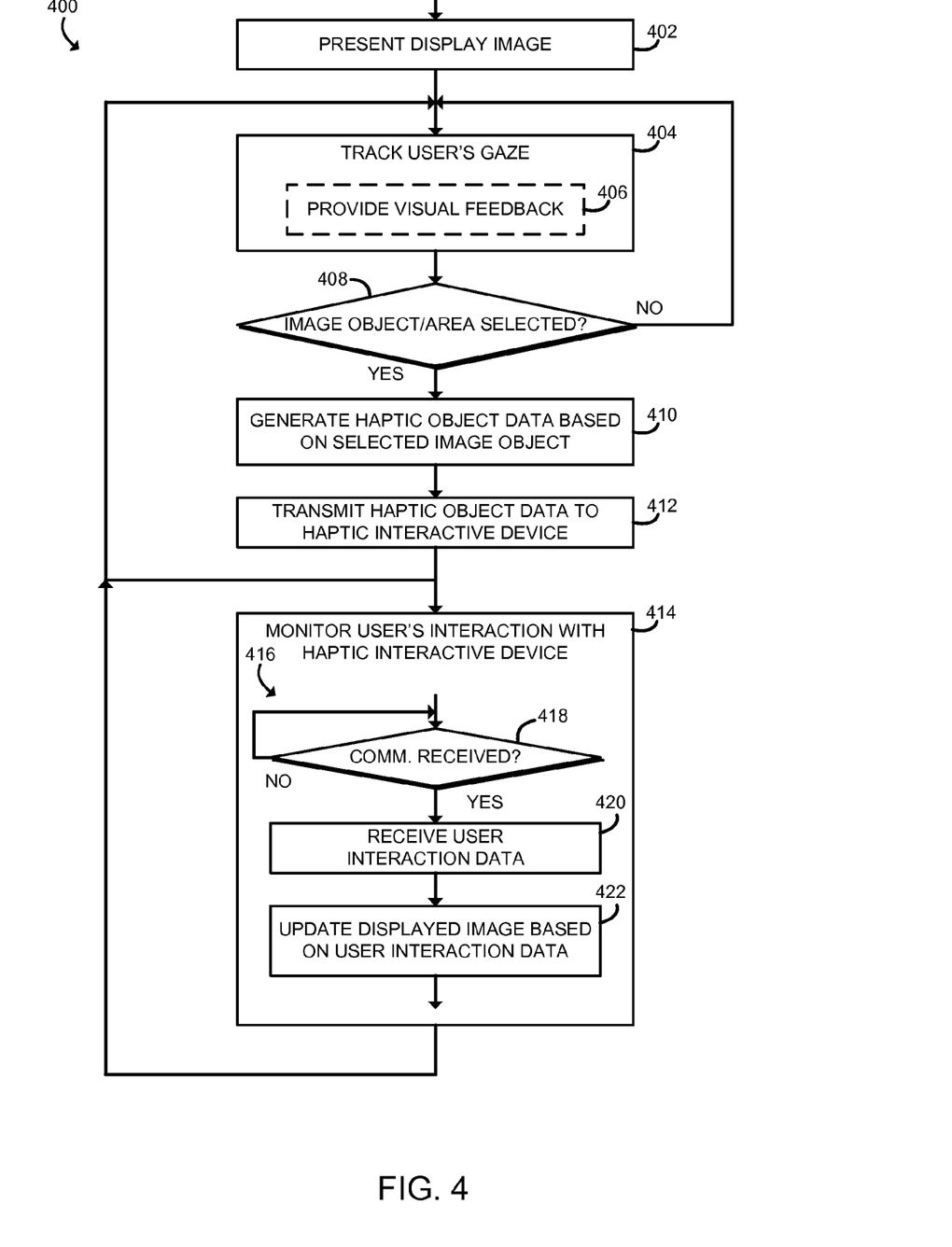
FIG. 4 is a simplified flow diagram of at least one embodiment of a method for managing haptic manipulation that may be executed by the computing device of FIGS. 1 and 3.

Referring now to FIG. 4, in use, the computing device 102 may execute a method 400 for managing haptic manipulation. The method 400 begins with block 402 in which the computing device 102 displays an image on the display 132. As discussed above, the image may be embodied as a still image or an image of video, streaming content, or other moving image. In block 404, the computing device 102 tracks the gaze of the user 110. As discussed above, the eye tracking sensor 136 of the computing device 102 may utilize any suitable methodology to track the user's 110 gaze. In some embodiments, the computing device 102 may provide a visual feedback to the user 110 that is indicative of the current area or location of the image at which the user is looking. For example, the computing device 102 may display a circle or other indicator on the image, highlight or colorize an image object of the image, or otherwise provide an indication to the user 110 of the location at which the user is currently looking or otherwise fixated on.

In block 408, the computing device 102 determines whether the user 110 has selected an image object. To do so, as discussed above, the computing device 102 may determine whether the gaze of the user 110 is fixated on an image object of the image displayed on the display 132. As discussed above, the image object may be embodied as a discrete virtual object, feature, or structure or may be embodied as a region or area of the image. In some embodiments, the computing device 102 may determine that the user 110 desires to select a particular image object in response to the user fixating her gaze on the image object for a reference threshold of time (e.g., the user 110 may select an image object by staring at the object for two or more seconds or some other temporal threshold). If the computing device 102 determines that the user 110 has not selected an image object, the method 400 loops back to block 404 in which the computing device 102 continues to track the user's gaze.

If, however, the computing device 102 determines that the user has selected an image object of the image based on the user's 110 gaze, the method 400 advances to block 410 in which the computing device 102 generates haptic object data based on the selected image object. As discussed above, the haptic object data may be embodied as any type of data usable by the haptic interactive device 104 to generate a haptic object corresponding to the selected image object. In block 412, the computing device 102 transmits the haptic object data to the haptic interactive device 104. The method 400 subsequently loops back to block 404 in which the computing device 102 continues to monitor the user's gaze for selection of a different image object of the image displayed on the display 132.

After the computing device 102 has transmitted the haptic object data in block 412, the method 400 additionally advances to block 414 in which the computing device 102 monitors the user's 110 interaction with the haptic interactive device 104. It should be appreciated that block 414 may be executed in parallel or otherwise contemporaneously with the execution of block 404.

To monitor the user's 110 interaction with the haptic interactive device 104, the computing device 102 may execute a sub-method 416. The sub-method 416 begins with block 418 in which the computing device 102 monitors for communications from the haptic interactive device 104. As discussed above, the haptic interactive device 104 transmits user interaction data indicative of the user's 110 interaction with the haptic object generated on the haptic interactive device 104. If the computing device 102 has not received any communications from the haptic interactive device 104, the sub-method 416 loops back to block 418 to continue monitoring for communications from the haptic interactive device 104. However, if the computing device 102 determines communications have been received from the haptic interactive device 104, the sub-method 416 advances to block 420 in which the computing device 102 receives the user interaction data transmitted by the haptic interactive device 104.

In block 422, the computing device 102 updates or modifies the selected image object based on the received user interaction data. As discussed above, the user interaction data may be indicative of any kind of interaction of the user 110 with the haptic object, which can be applied to the image object. For example, if the user interaction data indicates that the user has moved the haptic object, the computing device 102 moves the image object in block 422. Similarly, if the user interaction data indicates the user has deleted a portion of the haptic object, the computing device 102 deletes a corresponding portion of the image object in block 422. In this way, the user can modify or interact with an image object displayed on the display 132 via use of the haptic interactive device 104.

Figure 5:
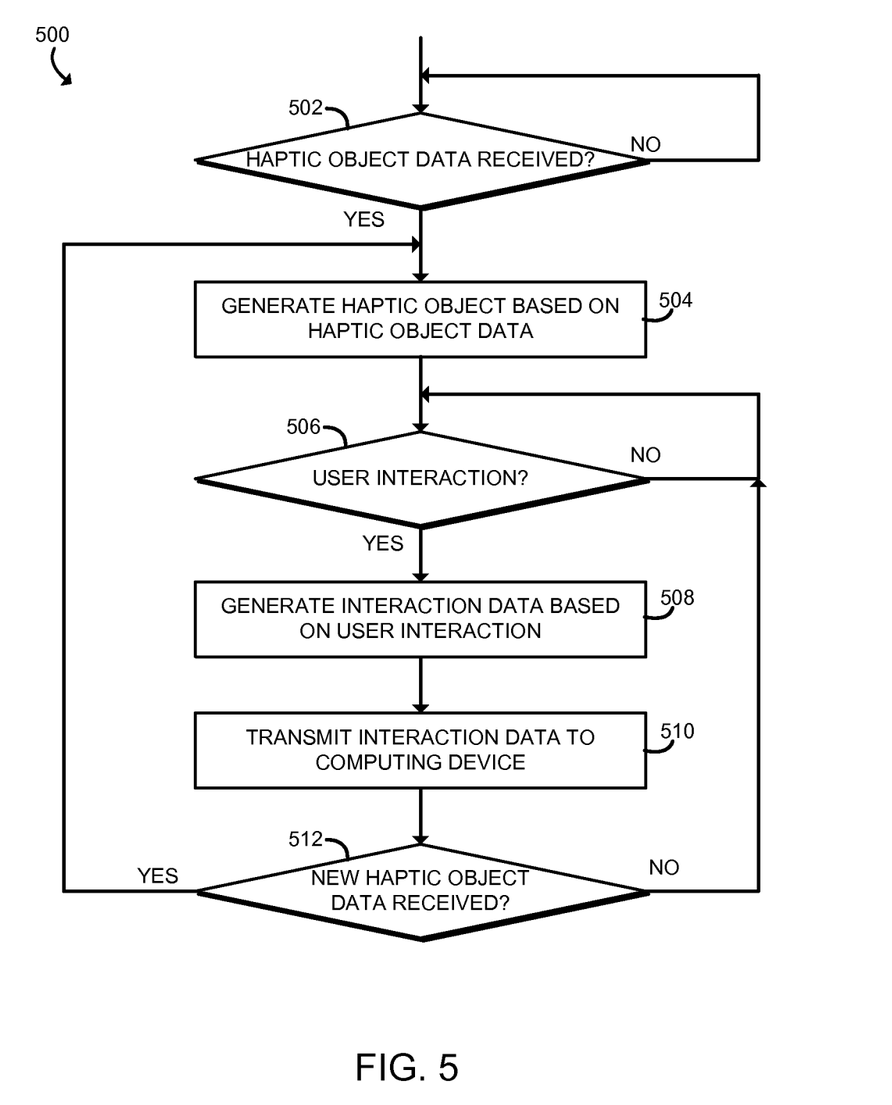
FIG. 5 is a simplified flow diagram of at least one embodiment of a method for interacting with a computing device based on haptic manipulation that may be executed by the haptic interactive device of FIGS. 1 and 3.

Referring now to FIG. 5, in use, the haptic interactive device 104 may execute a method 500 for interacting with the computing device 102 based on haptic manipulation. The method 500 begins with block 502 in which the haptic interactive device 104 determines whether any haptic object data has been received from the computing device 102. As discussed above, the haptic object data may be embodied as any type of data from which the haptic interactive device 104 may generate a haptic object corresponding to an image object selected by the user 110. If no communication has been received from the computing device 102, the method 500 loops back to block 502 in which the haptic interactive device 104 continues monitoring for haptic object data from the computing device 102.

If, however, haptic object data has been received from the computing device 102 in block 502, the method 500 advances to block 504 in which the haptic interactive device 104 generates a haptic object based on the received haptic object data. To do so, as discussed above, the haptic presentation module 304 and/or haptic controller 148 may control the haptic output surface 150 to generate the haptic object corresponding to the selected image object based on the received haptic object data. Again, as discussed above, the haptic object data may be embodied as specific control instructions usable by the haptic controller 148 to control the haptic output surface 150 and/or as reference data usable by the haptic object generation module 306 to generate the specific control instructions usable by the haptic controller 148.

After the corresponding haptic object has been generated on the haptic output surface 150, the method 500 advances to block 506 in which the haptic interactive device 104 monitors for interaction with the haptic object by the user 110. As discussed above, the user 110 may interact with the haptic object in any way including, but not limited to, moving, deleting, rotating, shifting, flipping, or resizing the haptic object or a component of the haptic object. If no user interaction is detected by the haptic interactive device 104, the method 500 loops back to block 506 in which the haptic interactive device 104 continues to monitor for user interaction.

If, however, the haptic interactive device 104 determines that the user has interacted with the haptic object in block 506, the method 500 advances to block 508 in which the haptic interactive device 104 generates user interaction data based on the user's 110 interaction. Again, as discussed above, the user interaction data may be embodied as any type of data that is capable of defining or identifying the user's interaction. For example, the user interaction data is embodied as data usable by the computing device 102 to modify or update the image object and may be embodied as, or otherwise include, spatial data, pixel data, vector data, instruction data, raw image data, or any other type of data from which the computing device 102 can infer or determine the user's desired interaction with the image object displayed on the display 132 as discussed above.

Subsequently, in block 510, the haptic interactive device 104 transmits the user interaction data generated in block 508 to the computing device 102 in block 510. In block 512, the haptic interactive device 104 determines whether a new haptic object data has been received from the computing device 102. If not, the method 500 loops back to block 506 in which the haptic interactive device 104 continues to monitor for further user interaction with the present haptic object. If, however, new haptic object data has been received, the method 500 loops back to block 504 in which the haptic interactive device 104 generates a new haptic object based on the new haptic object data. In this way, the haptic interactive device 104 may update or change the generated haptic object based on the currently selected image object of the user.

Figure 6:
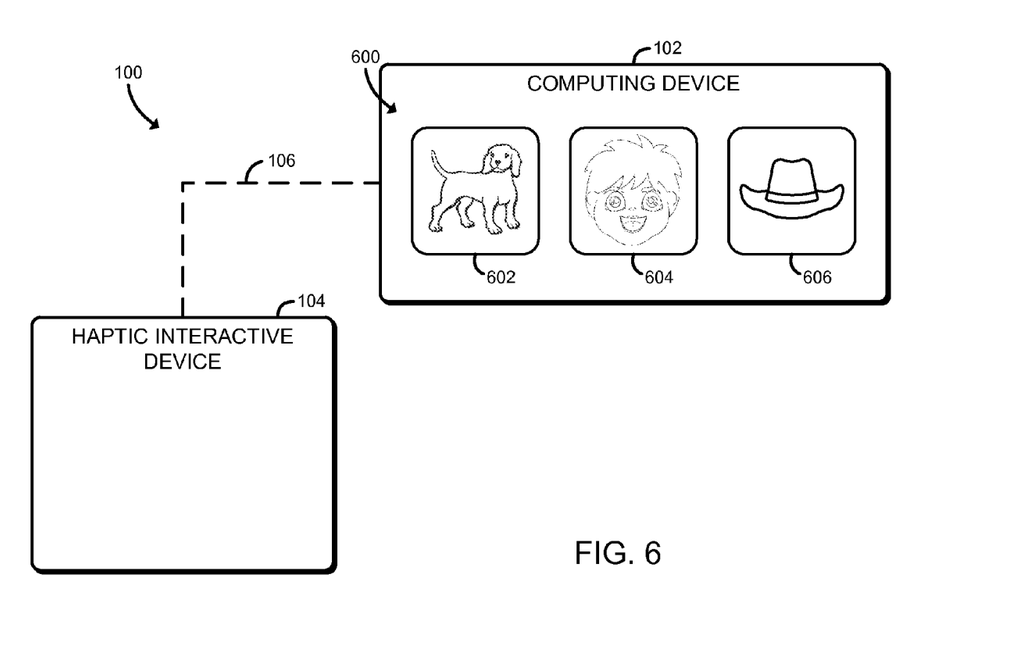
FIGS. 6-9 are simplified illustrative diagrams of corresponding outputs of the computing device of FIGS. 1 and 2 and the haptic interactive device of FIGS. 1 and 3 during execution of the methods of FIGS. 4 and 5.

Referring now to FIGS. 6-9, example outputs of the computing device 102 and that haptic interactive device 104 during execution of the methods 400 and 500 are shown. In FIG. 6, the computing device 102 has displayed an image 600 on the display 132. The image 600 illustratively includes a set of three image objects 602, 604, 606. Image object 602 is an illustrative picture of a dog, the image object 604 is an illustrative picture of a child, and the image object 606 is an illustrative picture of a hat. It should be appreciated that although each of the illustrative image objects 602, 604, 606 are embodied as discrete virtual objects, the image objects 602, 604, 606 may be embodied as regions or areas of the image 600 in other embodiments as discussed above.

The user 110 may select one of the image objects 602, 604, 606 by fixating her gaze on the desired image object 602, 604, 606 as discussed above. In some embodiments, the computing device 102 may highlight or provide some other form of visual feedback to the user 110 to indicate which image object 602, 604, 606 the user has selected and/or is currently looking at.

Figure 7:
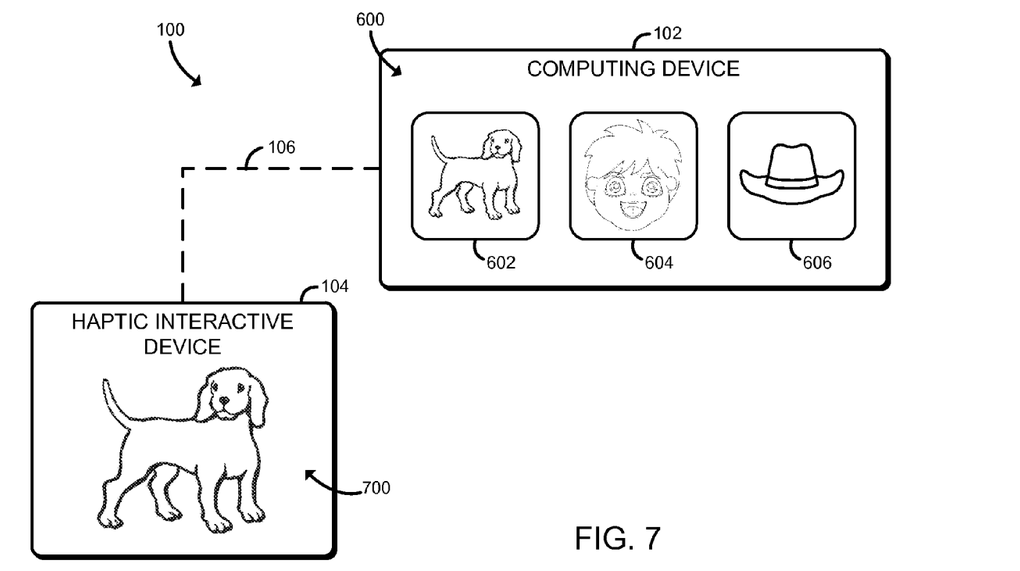

In the illustrative example, the user 110 has selected image object 602 by fixating her gaze on the image object 602. In response, the computing device 102 generates haptic object data corresponding to the selected image object 602 and transmits the haptic object data to the haptic interactive device 104. The haptic interactive device 104 subsequently generates a haptic object 700 on the haptic output surface 150 based on the received haptic object data. As discussed above, the haptic object 700 is a haptic representation of the selected image object 602, which the user 110 is capable of sensing via touching the haptic output surface 150.

Figure 8:
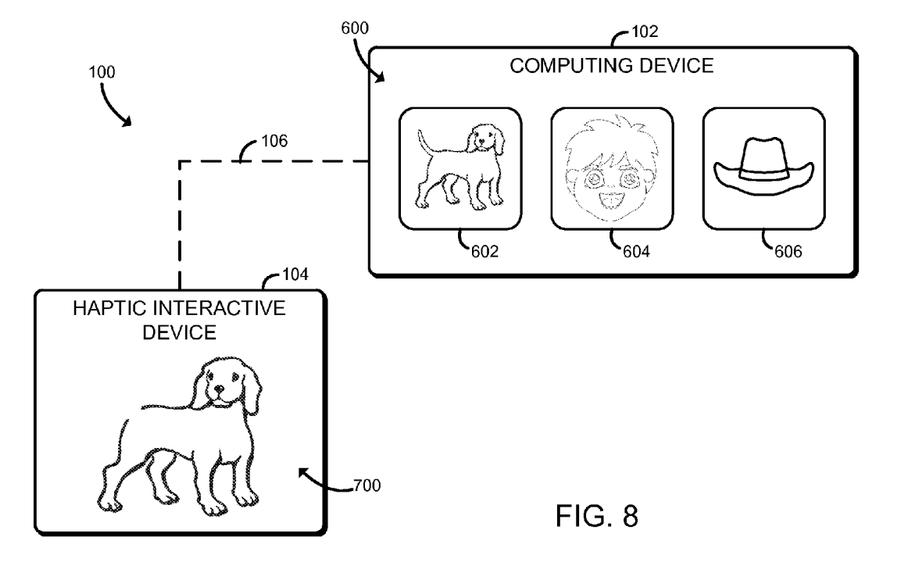

The haptic interactive device 104 monitors the user's 110 interaction with the haptic object 700. As discussed above, the user 110 may manipulate the haptic object 700 in any traditional way (e.g., moving, deleting, resizing, rotating, flipping, etc.). In the illustrative example, the user 110 has deleted a portion of the tail of the dog represented in the haptic object 700 as shown in FIG. 8. In response, the haptic interactive device 104 generates user interaction data indicative of the user's 110 deletion or removal of the tail of the dog and transmits the user interaction data to the computing device 102.

Figure 9:
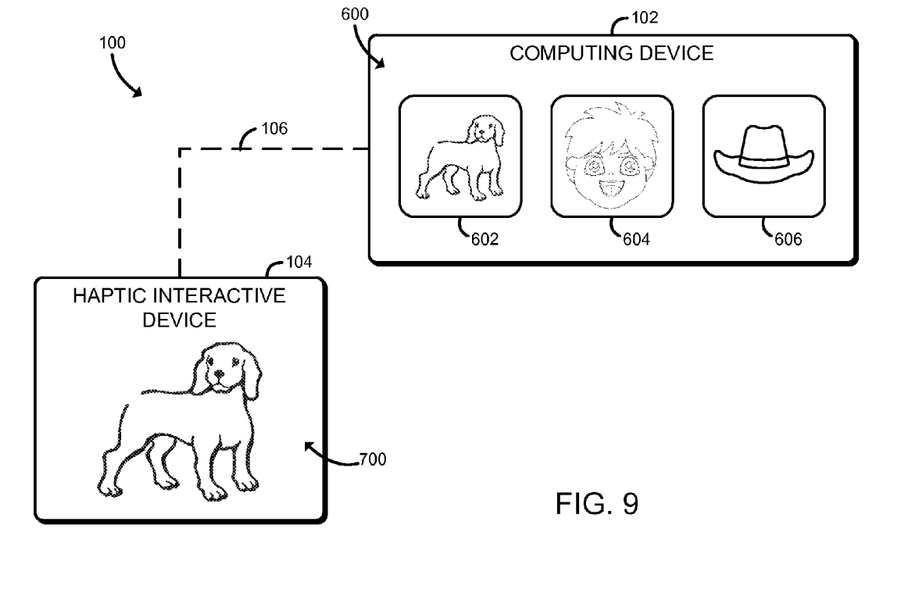

The computing device 102 receives the user interaction data from the haptic interactive device 104 and updates the image object 602 based on the user interaction data. For example, as shown in FIG. 9, the computing device 102 has updated the image object 602 to reflect the removal of the dog's tail represented in the image object 602. In this way, a user of the computing device 102 and haptic interactive device 104 can interact with the computing device 102 via haptic manipulation of haptic objects.

EXAMPLES

Illustrative examples of the devices, systems, and methods disclosed herein are provided below. An embodiment of the devices, systems, and methods may include any one or more, and any combination of, the examples described below.

Example 1 includes a computing device for managing haptic manipulation, the computing device comprising a display, a display module to display an image on the display; an eye tracking module to track a user's gaze on the image and identify an image object of the image based on the user's gaze; a haptic management module to generate haptic object data based on the image object, wherein the haptic object data is to enable a haptic interactive device to generate a haptic object representation of the image object; and a communication module to transmit the haptic object data to the haptic interactive device to facilitate generation of the haptic object based on the haptic object data.

Example 2 includes the subject matter of Example 1, and wherein the haptic management module is further to monitor the user's interaction with the haptic object.

Example 3 includes the subject matter of any of Examples 1 and 2, and wherein to monitor the user's interaction with the haptic object comprises to receive user interaction data from the haptic interactive device, wherein the user interaction data is indicative of a user's interaction with the haptic object on the haptic interactive device; and modify the image object of the image displayed on the display based on the user interaction data.

Example 4 includes the subject matter of any of Examples 1-3, and wherein to modify the image object comprises to delete a component of the image object of the image displayed on the display, move the image object on the image displayed on the display, delete the image object from the image displayed on the display, change an orientation of the image object of the image displayed on the display, flip the image object on the image displayed of the image displayed on the display, resize the image object of the image displayed on the display, or rotate the image object of the image displayed on the display.

Example 5 includes the subject matter of any of Examples 1-4, and wherein the user interaction data is indicative of a user's selection of a component of the haptic object and wherein to modify the image object comprises to modify a component of the image object corresponding to the selected component of the haptic object.

Example 6 includes the subject matter of any of Examples 1-5, and wherein to monitor the user's interaction with the haptic object comprises to receive user interaction data from the haptic interactive device, wherein the user interaction data is indicative of movement of the haptic object on the haptic interactive device; and interpret a user's interaction with the image object based on the movement of the haptic object.

Example 7 includes the subject matter of any of Examples 1-6, and wherein the image object comprises a region of the image.

Example 8 includes the subject matter of any of Examples 1-7, and wherein to identify the image object of the image comprises to identify an image object of the image based on a fixation of the user's gaze on the image object.

Example 9 includes the subject matter of any of Examples 1-8, and wherein to identify the image object based on the fixation of the user's gaze comprises to identify the image object based on a length of time for which the user's gaze is fixated on the image object.

Example 10 includes the subject matter of any of Examples 1-9, and wherein to display an image comprises to display an image comprising a plurality of image objects; and to identify an image object of the image comprises to identify a selected image object of the plurality of image objects based on a fixation of the user's gaze on the selected image object.

Example 11 includes the subject matter of any of Examples 1-10, and wherein the eye tracking module is further to provide visual feedback of the identified image object to the user.

Example 12 includes the subject matter of any of Examples 1-11, and wherein the eye tracking module is to highlight the identified image object on display of the computing device to provide the visual feedback.

Example 13 includes the subject matter of any of Examples 1-12, and wherein to identify an image object of the image comprises to identify a first image object and a second image object of the image based on the user's gaze; generate haptic object data based on the image object comprises to generate first haptic object data and second haptic object data, wherein the first haptic object data is to enable the haptic interactive device to generate a first haptic object representation of the first image object and the second haptic object data is to enable the haptic interactive device to generate a second haptic object representation of the second image object; and transmit the haptic object data comprises to transmit the first haptic object data and the second haptic object data to the haptic interactive device to facilitate generation of the first haptic object and the second haptic object.

Example 14 includes the subject matter of any of Examples 1-13, and wherein the haptic management module is further to receive user interaction data from the haptic interactive device, wherein the user interaction data is indicative of a user's rearrangement of the relative location of the first haptic object and the second haptic object on the haptic interactive device, and interpret a user's interaction with the first image object or the second image object based on the rearrangement of the relative location of the first haptic object and the second haptic object.

Example 15 includes a haptic interactive device for interacting with a computing device based on haptic manipulation, the haptic interactive device comprising a haptic output surface; a communication module to receive haptic object data from a computing device in response to a user's gaze fixation on a corresponding image object of an image displayed by the computing device; a haptic presentation module to generate a haptic object on the haptic output surface based on the haptic object data, wherein the haptic object comprises a haptic object representation of the image object and generate user interaction data based on the user's interaction with the haptic object; wherein the communication module is further to transmit, to the computing device, the user interaction data indicative of the user's interaction with the haptic object.

Example 16 includes the subject matter of Example 15, and wherein to generate the user interaction data comprises to generate user interaction data indicative of the user's intention to delete a component of the image object, move the image object, delete the image object, modify an orientation of the image object, flip the image object, resize the image object, or rotate the image object.

Example 17 includes the subject matter of any of Examples 15 and 16, and wherein to generate user interaction data comprises to generate user interaction data indicative of the user's selection of a component of the haptic object.

Example 18 includes the subject matter of any of Examples 15-17, and wherein the haptic object data corresponds to a region of the image displayed by the computing device.

Example 19 includes the subject matter of any of Examples 15-18, and wherein to receive haptic object data comprises to receive first haptic object data and second haptic object data from the computing device in response to the user's gaze fixation on a first image object and a second image object, wherein the first haptic object data corresponds to the first image object and the second haptic object data corresponds to the second image object, generate a haptic object comprises to generate a first haptic object based on the first haptic object data and second haptic object based on the second haptic object data, wherein the first haptic object comprises a haptic object representation of the first image object and the second haptic object comprises a haptic object representation of the second image object.

Example 20 includes the subject matter of any of Examples 15-19, and wherein to generate user interaction data comprises to generate user interaction data indicative of the user's rearrangement of the first haptic object and the second haptic object on the haptic interactive device.

Example 21 includes a method for managing haptic manipulation of a computing device, the method comprising displaying, by the computing device, an image on a display of the computing device; tracking, by the computing device, a user's gaze on the image; identifying, by the computing device, an image object of the image based on the user's gaze; generating, by the computing device, haptic object data based on the image object, wherein the haptic object data is to enable a haptic interactive device to generate a haptic object representation of the image object; and transmitting the haptic object data to the haptic interactive device to facilitate generation of the haptic object based on the haptic object data.

Example 22 includes the subject matter of Example 21, and further including monitoring, by the computing device, the user's interaction with the haptic object.

Example 23 includes the subject matter of any of Examples 21 and 22, and wherein monitoring the user's interaction with the haptic object comprises receiving user interaction data from the haptic interactive device, wherein the user interaction data is indicative of a user's interaction with the haptic object on the haptic interactive device; and modifying the image object of the image displayed on the display based on the user interaction data.

Example 24 includes the subject matter of any of Examples 21-23, and wherein modifying the image object comprises at least one of deleting a component of the image object of the image displayed on the display, moving the image object on the image displayed on the display, deleting the image object from the image displayed on the display, changing an orientation of the image object of the image displayed on the display, flipping the image object on the image displayed of the image displayed on the display, resizing the image object of the image displayed on the display, or rotating the image object of the image displayed on the display.

Example 25 includes the subject matter of any of Examples 21-24, and wherein the user interaction data is indicative of a user's selection of a component of the haptic object and wherein modifying the image object comprises modifying a component of the image object corresponding to the selected component of the haptic object.

Example 26 includes the subject matter of any of Examples 21-25, and wherein monitoring the user's interaction with the haptic object comprises receiving user interaction data from the haptic interactive device, wherein the user interaction data is indicative of movement of the haptic object on the haptic interactive device; and interpreting a user's interaction with the image object based on the movement of the haptic object.

Example 27 includes the subject matter of any of Examples 21-26, and wherein the image object comprises a region of the image.

Example 28 includes the subject matter of any of Examples 21-27, and wherein identifying the image object of the image comprises identifying an image object of the image based on a fixation of the user's gaze on the image object.

Example 29 includes the subject matter of any of Examples 21-28, and wherein identifying the image object based on the fixation of the user's gaze comprises identifying the image object based on a length of time for which the user's gaze is fixated on the image object.

Example 30 includes the subject matter of any of Examples 21-29, and wherein displaying an image comprises displaying an image comprising a plurality of image objects; and identifying an image object of the image comprises identifying a selected image object of the plurality of image objects based on a fixation of the user's gaze on the selected image object.

Example 31 includes the subject matter of any of Examples 21-30, and further including providing, by the computing device, visual feedback of the identified image object to the user.

Example 32 includes the subject matter of any of Examples 21-31, and wherein providing visual feedback comprises highlighting the identified image object on display of the computing device.

Example 33 includes the subject matter of any of Examples 21-32, and wherein identifying an image object of the image comprises identifying a first image object and a second image object of the image based on the user's gaze; generating haptic object data based on the image object comprises generating first haptic object data and second haptic object data, wherein the first haptic object data is to enable the haptic interactive device to generate a first haptic object representation of the first image object and the second haptic object data is to enable the haptic interactive device to generate a second haptic object representation of the second image object; and transmitting the haptic object data comprises transmitting the first haptic object data and the second haptic object data to the haptic interactive device to facilitate generation of the first haptic object and the second haptic object.

Example 34 includes the subject matter of any of Examples 21-33, and further including receiving user interaction data from the haptic interactive device, wherein the user interaction data is indicative of a user's rearrangement of the relative location of the first haptic object and the second haptic object on the haptic interactive device, and interpreting a user's interaction with the first image object or the second image object based on the rearrangement of the relative location of the first haptic object and the second haptic object.

Example 35 includes a method for interacting with a computing device based on haptic manipulation, the method comprising receiving, by a haptic interactive device, haptic object data from a computing device in response to a user's gaze fixation on a corresponding image object of an image displayed by the computing device; generating, by the haptic interactive device, a haptic object based on the haptic object data, wherein the haptic object comprises a haptic object representation of the image object; generating, by the haptic interactive device, user interaction data based on the user's interaction with the haptic object; and transmitting, by the haptic interactive device and to the computing device, user interaction data indicative of the user's interaction with the haptic object.

Example 36 includes the subject matter of Example 35, and wherein generating the user interaction data comprises generating user interaction data indicative of the user's intention to delete a component of the image object, move the image object, delete the image object, modify an orientation of the image object, flip the image object, resize the image object, or rotate the image object.

Example 37 includes the subject matter of any of Examples 35 and 36, and wherein generating user interaction data comprises generating user interaction data indicative of the user's selection of a component of the haptic object.

Example 38 includes the subject matter of any of Examples 35-37, and wherein the haptic object data corresponds to a region of the image displayed by the computing device.

Example 39 includes the subject matter of any of Examples 35-38, and wherein receiving haptic object data comprises receiving first haptic object data and second haptic object data from the computing device in response to the user's gaze fixation on a first image object and a second image object, wherein the first haptic object data corresponds to the first image object and the second haptic object data corresponds to the second image object, generating a haptic object comprises generating a first haptic object based on the first haptic object data and second haptic object based on the second haptic object data, wherein the first haptic object comprises a haptic object representation of the first image object and the second haptic object comprises a haptic object representation of the second image object.

Example 40 includes the subject matter of any of Examples 35-39, and wherein generating user interaction data comprises generating user interaction data indicative of the user's rearrangement of the first haptic object and the second haptic object on the haptic interactive device.

Example 41 includes one or more machine readable storage media comprising a plurality of instructions stored thereon that in response to execution cause a computing device to perform the method of any of Examples 21-40.

Example 42 includes a computing device for managing haptic manipulation, the computing device comprising means for displaying an image on a display of the computing device; means for tracking a user's gaze on the image; means for identifying an image object of the image based on the user's gaze; means for generating haptic object data based on the image object, wherein the haptic object data is to enable a haptic interactive device to generate a haptic object representation of the image object; and means for transmitting the haptic object data to the haptic interactive device to facilitate generation of the haptic object based on the haptic object data.

Example 43 includes the subject matter of Example 42, and further including means for monitoring the user's interaction with the haptic object.

Example 44 includes the subject matter of any of Examples 42 and 43, and wherein the means for monitoring the user's interaction with the haptic object comprises means for receiving user interaction data from the haptic interactive device, wherein the user interaction data is indicative of a user's interaction with the haptic object on the haptic interactive device; and means for modifying the image object of the image displayed on the display based on the user interaction data.

Example 45 includes the subject matter of any of Examples 42-44, and wherein the means for modifying the image object comprises at least one of means for deleting a component of the image object of the image displayed on the display, means for moving the image object on the image displayed on the display, means for deleting the image object from the image displayed on the display, means for changing an orientation of the image object of the image displayed on the display, means for flipping the image object on the image displayed of the image displayed on the display, means for resizing the image object of the image displayed on the display, or means for rotating the image object of the image displayed on the display.

Example 46 includes the subject matter of any of Examples 42-45, and wherein the user interaction data is indicative of a user's selection of a component of the haptic object and wherein the means for modifying the image object comprises means for modifying a component of the image object corresponding to the selected component of the haptic object.

Example 47 includes the subject matter of any of Examples 42-46, and wherein the means for monitoring the user's interaction with the haptic object comprises means for receiving user interaction data from the haptic interactive device, wherein the user interaction data is indicative of movement of the haptic object on the haptic interactive device; and means for interpreting a user's interaction with the image object based on the movement of the haptic object.

Example 48 includes the subject matter of any of Examples 42-47, and wherein the image object comprises a region of the image.

Example 49 includes the subject matter of any of Examples 42-48, and wherein the means for identifying the image object of the image comprises means for identifying an image object of the image based on a fixation of the user's gaze on the image object.

Example 50 includes the subject matter of any of Examples 42-49, and wherein the means for identifying the image object based on the fixation of the user's gaze comprises means for identifying the image object based on a length of time for which the user's gaze is fixated on the image object.

Example 51 includes the subject matter of any of Examples 42-50, and wherein the means for displaying an image comprises means for displaying an image comprising a plurality of image objects; and the means for identifying an image object of the image comprises means for identifying a selected image object of the plurality of image objects based on a fixation of the user's gaze on the selected image object.

Example 52 includes the subject matter of any of Examples 42-51, and further including means for providing visual feedback of the identified image object to the user.

Example 53 includes the subject matter of any of Examples 42-52, and wherein the means for providing visual feedback comprises means for highlighting the identified image object on display of the computing device.

Example 54 includes the subject matter of any of Examples 42-53, and wherein the means for identifying an image object of the image comprises means for identifying a first image object and a second image object of the image based on the user's gaze; the means for generating haptic object data based on the image object comprises means for generating first haptic object data and second haptic object data, wherein the first haptic object data is to enable the haptic interactive device to generate a first haptic object representation of the first image object and the second haptic object data is to enable the haptic interactive device to generate a second haptic object representation of the second image object; and the means for transmitting the haptic object data comprises means for transmitting the first haptic object data and the second haptic object data to the haptic interactive device to facilitate generation of the first haptic object and the second haptic object.

Example 55 includes the subject matter of any of Examples 42-54, and further including means for receiving user interaction data from the haptic interactive device, wherein the user interaction data is indicative of a user's rearrangement of the relative location of the first haptic object and the second haptic object on the haptic interactive device, and means for interpreting a user's interaction with the first image object or the second image object based on the rearrangement of the relative location of the first haptic object and the second haptic object.

Example 56 includes a haptic interactive device for interacting with a computing device based on haptic manipulation, the haptic interactive device comprising means for receiving haptic object data from a computing device in response to a user's gaze fixation on a corresponding image object of an image displayed by the computing device; means for generating a haptic object based on the haptic object data, wherein the haptic object comprises a haptic object representation of the image object; means for generating user interaction data based on the user's interaction with the haptic object; and means for transmitting, to the computing device, user interaction data indicative of the user's interaction with the haptic object.

Example 57 includes the subject matter of Example 56, and wherein the means for generating the user interaction data comprises means for generating user interaction data indicative of the user's intention to delete a component of the image object, move the image object, delete the image object, modify an orientation of the image object, flip the image object, resize the image object, or rotate the image object.

Example 58 includes the subject matter of any of Examples 56 and 57, and wherein the means for generating user interaction data comprises means for generating user interaction data indicative of the user's selection of a component of the haptic object.

Example 59 includes the subject matter of any of Examples 56-58, and wherein the haptic object data corresponds to a region of the image displayed by the computing device.

Example 60 includes the subject matter of any of Examples 56-59, and wherein the means for receiving haptic object data comprises means for receiving first haptic object data and second haptic object data from the computing device in response to the user's gaze fixation on a first image object and a second image object, wherein the first haptic object data corresponds to the first image object and the second haptic object data corresponds to the second image object, the means for generating a haptic object comprises means for generating a first haptic object based on the first haptic object data and second haptic object based on the second haptic object data, wherein the first haptic object comprises a haptic object representation of the first image object and the second haptic object comprises a haptic object representation of the second image object.

Example 61 includes the subject matter of any of Examples 56-60, and wherein the means for generating user interaction data comprises means for generating user interaction data indicative of the user's rearrangement of the first haptic object and the second haptic object on the haptic interactive device.

The invention claimed is:

1. A computing device for managing haptic manipulation, the computing device comprising:
   a display,
   a display module to display an image on the display;
   an eye tracking module to track a user's gaze on the image and identify an image object of the image based on the user's gaze, wherein the eye tracking module is to identify the image object in response to a determination that the user's gaze has fixated on the image object for a reference threshold of time;
a haptic management module to generate haptic object data for the identified image object in response to the image object being identified based on the determination that the user's gaze has fixated on the image object for a reference threshold of time, wherein the haptic object data is to enable a haptic interactive device to generate a haptic object representation of the image object, wherein the haptic object representation comprises a two-dimensional shape that has similarity to the image object; and
a communication module to transmit the haptic object data to the haptic interactive device to facilitate generation of the haptic object based on the haptic object data,
wherein the haptic management module is further to (i) receive user interaction data from the haptic interactive device, wherein the user interaction data is indicative of a user's tactile manipulation of the haptic object on the haptic interactive device and (ii) modify the image object of the image displayed on the display based on the user interaction data.

2. The computing device of claim 1, wherein the user interaction data is indicative of a user's tactile selection of a component of the haptic object and wherein to modify the image object comprises to modify a component of the image object corresponding to the selected component of the haptic object.

3. The computing device of claim 1, wherein to monitor the user's interaction with the haptic object comprises to:
receive user interaction data from the haptic interactive device, wherein the user interaction data is indicative of movement of the haptic object on the haptic interactive device; and
interpret a user's interaction with the image object based on the movement of the haptic object.

4. The computing device of claim 1, wherein the image object comprises a region of the image.

5. The computing device of claim 1, wherein to identify the image object of the image comprises to identify an image object of the image based on a fixation of the user's gaze on the image object.

6. The computing device of claim 1, wherein the eye tracking module is further to provide visual feedback of the identified image object to the user.

7. A haptic interactive device for interacting with a computing device based on haptic manipulation, the haptic interactive device comprising:
a haptic output surface;
a communication module to receive haptic object data from a computing device, wherein haptic object data was generated for an image object in response to the image object being identified based on a determination that the user's gaze has fixated on the image object for a reference threshold of time;
a haptic presentation module to (i) generate a haptic object on the haptic output surface based on the haptic object data, wherein the haptic object comprises a two-dimensional shape that has similarity to the image object, and (ii) generate user interaction data based on the user's tactile manipulation of the haptic object;
wherein the communication module is further to transmit, to the computing device, the user interaction data indicative of the user's interaction with the haptic object.

8. The haptic interactive device of claim 7, wherein to generate user interaction data comprises to generate user interaction data indicative of the user's tactile selection of a component of the haptic object.

9. The haptic interactive device of claim 7, wherein the haptic object data corresponds to a region of the image displayed by the computing device.

10. The haptic interactive device of claim 7, wherein to:
receive haptic object data comprises to receive first haptic object data and second haptic object data from the computing device in response to the user's gaze fixation on a first image object and a second image object, wherein the first haptic object data corresponds to the first image object and the second haptic object data corresponds to the second image object,
generate a haptic object comprises to generate a first haptic object based on the first haptic object data and second haptic object based on the second haptic object data, wherein the first haptic object comprises a haptic object representation of the first image object and the second haptic object comprises a haptic object representation of the second image object.

11. The haptic interactive device of claim 10, wherein to generate user interaction data comprises to generate user interaction data indicative of the user's rearrangement of the first haptic object and the second haptic object on the haptic interactive device.

12. One or more non-transitory, machine readable storage media comprising a plurality of instructions stored thereon that, in response to execution, cause a computing device to:
display an image on a display of the computing device;
track a user's gaze on the image;
identify an image object of the image based on the user's gaze in response to a determination that the user's gaze has fixated on the image object for a reference threshold of time;
generate haptic object data based on the image object, wherein the haptic object data is to enable a haptic interactive device to generate a haptic object representation of the identified image object in response to the image object being identified based on the determination that the user's gaze has fixated on the image object for a reference threshold of time, wherein the haptic object representation comprises a two-dimensional shape that has similarity to the image object;
transmit the haptic object data to the haptic interactive device to facilitate generation of the haptic object based on the haptic object data;
receive user interaction data from the haptic interactive device, wherein the user interaction data is indicative of a user's tactile manipulation of the haptic object on the haptic interactive device; and
modify the image object of the image displayed on the display based on the user interaction data.

13. The one or more non-transitory, machine readable storage media of claim 12, wherein the user interaction data is indicative of a user's tactile selection of a component of the haptic object and wherein to modify the image object comprises to modify a component of the image object corresponding to the selected component of the haptic object.

14. The one or more non-transitory, machine readable storage media of claim 12, wherein to monitor the user's interaction with the haptic object comprises to:

receive user interaction data from the haptic interactive device, wherein the user interaction data is indicative of movement of the haptic object on the haptic interactive device; and interpret a user's interaction with the image object based on the movement of the haptic object.

15. The one or more non-transitory, machine readable storage media of claim 12, wherein the image object comprises a region of the image.

16. The one or more non-transitory, machine readable storage media of claim 12, wherein the plurality of instructions further cause the computing device to provide visual feedback of the identified image object to the user.

17. One or more non-transitory, machine readable storage media comprising a plurality of instructions stored thereon that, in response to execution, cause a haptic interactive device to:

receive haptic object data from a computing device, wherein haptic object data was generated for an image object in response to the image object being identified based on a determination that the user's gaze has fixated on the image object for a reference threshold of time;

generate a haptic object based on the haptic object data, wherein the haptic object comprises a two-dimensional shape that has similarity to the image object;

generate user interaction data based on the user's tactile manipulation of the haptic object; and transmit, to the computing device, user interaction data indicative of the user's interaction with the haptic object.

18. The one or more non-transitory, machine readable storage media of claim 17, wherein to generate user interaction data comprises to generate user interaction data indicative of the user's tactile selection of a component of the haptic object.

19. The one or more non-transitory, machine readable storage media of claim 17, wherein the haptic object data corresponds to a region of the image displayed by the computing device.

20. The one or more non-transitory, machine readable storage media of claim 17, wherein:

to receive haptic object data comprises to receive first haptic object data and second haptic object data from the computing device in response to the user's gaze fixation on a first image object and a second image object, wherein the first haptic object data corresponds to the first image object and the second haptic object data corresponds to the second image object, to generate a haptic object comprises to generate a first haptic object based on the first haptic object data and second haptic object based on the second haptic object data, wherein the first haptic object comprises a haptic object representation of the first image object and the second haptic object comprises a haptic object representation of the second image object.

21. The one or more non-transitory, machine readable storage media of claim 20, wherein to generate user interaction data comprises to generate user interaction data indicative of the user's rearrangement of the first haptic object and the second haptic object on the haptic interactive device.

22. A method for managing haptic manipulation of a computing device, the method comprising:

displaying, by the computing device, an image on a display of the computing device;

tracking, by the computing device, a user's gaze on the image;

identifying, by the computing device, an image object of the image based on the user's gaze in response to a determination that the user's gaze has fixated on the image object for a reference threshold of time;

generating, by the computing device, haptic object data based on the identified image object, in response to the image object being identified based on the determination that the user's gaze has fixated on the image object for a reference threshold of time, wherein the haptic object data is to enable a haptic interactive device to generate a haptic object representation of the image object, wherein the haptic object representation comprises a two-dimensional shape that has similarity to the image object;

transmitting the haptic object data to the haptic interactive device to facilitate generation of the haptic object based on the haptic object data;

receiving user interaction data from the haptic interactive device, wherein the user interaction data is indicative of a user's tactile manipulation of the haptic object on the haptic interactive device; and modifying the image object of the image displayed on the display based on the user interaction data.

23. The method of claim 22, wherein the user interaction data is indicative of a user's tactile selection of a component of the haptic object and wherein modifying the image object comprises modifying a component of the image object corresponding to the selected component of the haptic object.

24. A method for interacting with a computing device based on haptic manipulation, the method comprising:

receiving, by a haptic interactive device, haptic object data from a computing device wherein haptic object data was generated for an image object in response to the image object being identified based on a determination that the user's gaze has fixated on the image object for a reference threshold of time;

generating, by the haptic interactive device, a haptic object based on the haptic object data, wherein the haptic object comprises a two-dimensional shape that has similarity to the image object;

generating, by the haptic interactive device, user interaction data based on the user's tactile manipulation of the haptic object; and transmitting, by the haptic interactive device and to the computing device, user interaction data indicative of the user's interaction with the haptic object.

25. The method of claim 24, wherein generating user interaction data comprises generating user interaction data indicative of the user's tactile selection of a component of the haptic object.

* * * * *